No. 725,040. PATENTED APR. 14, 1903.
R. CHASSÉ.
ANIMAL TRAP.
APPLICATION FILED JUNE 23, 1902.
NO MODEL.
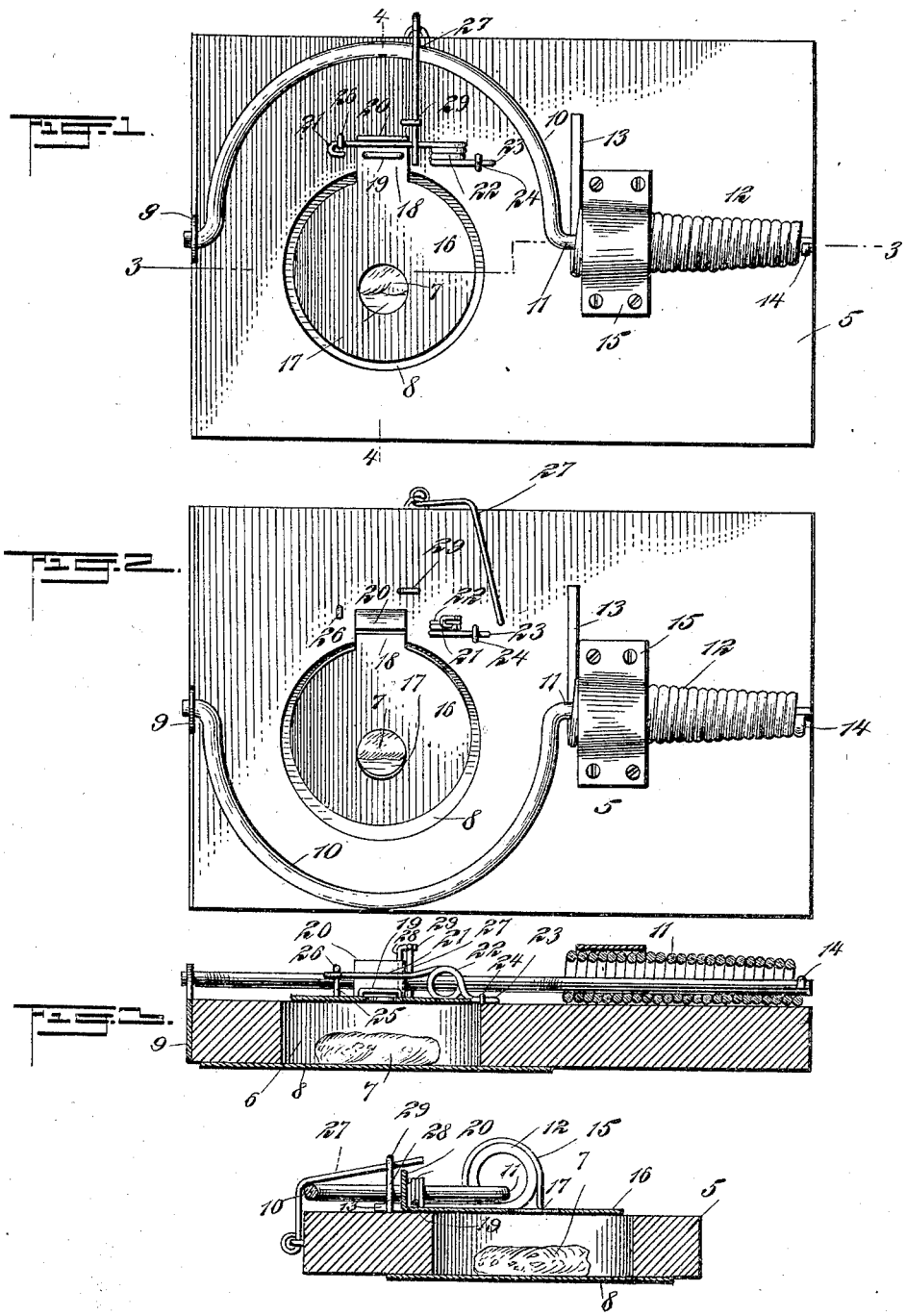
WITNESSES:
INVENTOR:
Raphael Chassé
BY his ATTORNEY

UNITED STATES PATENT OFFICE.

RAPHAEL CHASSÉ, OF NEW YORK, N. Y.

ANIMAL-TRAP.

SPECIFICATION forming part of Letters Patent No. 725,040, dated April 14, 1903.

Application filed June 23, 1902. Serial No. 112,728. (No model.)

*To all whom it may concern:*

Be it known that I, RAPHAEL CHASSÉ, a citizen of the United States, and a resident of New York, borough of Manhattan, in the county of New York and State of New York, have made and invented certain new and useful Improvements in Animal-Traps, of which the following is a specification.

My invention relates to an improvement in animal-traps, the object of the same being to provide a device of this character which shall be cheap to manufacture, certain and effective in its operations, and which may be easily and readily set with little or no danger of being accidentally sprung during the setting operation, whereby may be avoided all danger of injury to the hands or fingers of the person while setting the trap.

With these and other ends in view my invention consists in certain novel features of construction and combinations of parts, as will be hereinafter fully described, and pointed out in the claims.

In the accompanying drawings, Figure 1 is a plan view of my improved trap in its set position. Fig. 2 is a similar view of the same after being sprung. Fig. 3 is a sectional view taken on the line 3 3 of Fig. 1. Fig. 4 is a sectional view taken on the line 4 4 of Fig. 1.

Referring to the drawings, 5 represents a base made of any desired material, but preferably of wood, and having provided therein a hole or opening 6, forming a receptacle for containing the bait 7. This hole or opening may extend entirely through the same, as shown in Figs. 3 and 4, or, if desired, only partially through the base 5. In the former case the bait 7 may rest upon the ground, floor, or other support upon which the trap rests, or upon a plate 8, placed below the opening.

Over the opening 6, formed in the base 5, fits the plate or door 16, preferably made of sheet metal and of a diameter slightly smaller than that of the opening 5 in order that it may be slightly depressed therein in springing the trap, said plate being provided with a central opening 17, through which the bait 7 may be seen or scented. This plate 16 has formed thereon the arm 18, through which it is pivoted, by means of the staple or other fastening 19, to the base or block 5, the outer end of said arm 18 being bent upwardly into the vertical arm 20. In order to hold this plate 16 in its set position—that is, about flush with the upper surface of the base or block 5—I secure to the latter the arm 21, one end of which is coiled into a spring 22, the extreme end 23 thereof being secured to the block by means of the staple or other fastening 24. In the base or block 5 and on the opposite side of the arm 18 is secured the lower end of the vertical rod 25, the extreme upper end of which is slightly curved or bent over, as shown at 26, in order to detachably hold in place the free end of the arm 21 when the trap is set, as hereinafter described.

To the base 5, and preferably to one edge thereof, is secured the plate 9, having an opening therein for the reception of one end of the rod or bar 10, curved or bent in the form of a semicircle and provided with the straight arm 11, around which arm is coiled the spring 12, one end 13 of the latter resting against the base 5 and the opposite end 14 secured to the extreme outer end of the arm 11, the several parts being held in their proper positions by means of the bent or curved plate 15 fitting over and upon the spring 12 and screwed or otherwise secured to the base 5, the tendency of the spring being to hold the curved arm 10 in its normal position, as illustrated in Fig. 2.

To the base or block 5, and preferably at one edge thereof, is pivotally secured one end of the bent arm 27, the opposite end of said arm being free. To the block is also secured the lower end of the vertical rod 28, the upper extreme end 29 thereof being slightly curved or bent over to engage with the free end of the arm 27 when the trap is set, as illustrated in Fig. 1.

When it is desired to set the trap, the parts being in the positions as illustrated in Fig. 2, the pivoted plate 16 is raised until it is about flush with the upper surface of the block or base 5. The arm 21 is then pressed downwardly in front of the vertical arm 20 and its free end passed under the bent end 26 of the vertical rod 25, in which position it is held by the coiled spring portion 22. The curved bar or rod 10 is forced out of its former position over to the opposite side of the opening 6, as illustrated in Fig. 1, and the pivoted rod 27 swung over the same and under the bent end 29 of the rod 28, the pressure of the rod 10 against the arm 27 holding the same in position, said arm 27 by reason of its engagement with the bent end 29 of the vertical rod 28 holding the rod 10 in the position as illustrated in Fig. 1. If now the plate 16 is slightly depressed, the vertical arm 20 thereof is brought slightly forward, carrying with it the arm 21 and releasing the same from its engagement with the bent end 26 of the rod 25, allowing said arm 21 to be raised to its vertical position by reason of the tension of the spring portion 22. In springing upwardly into its vertical position the arm 21 strikes against the bent arm 27, thereby causing it to disengage from the bent end 29 of the rod 28, which in turn releases the curved bar 10, the latter springing back to its original position, as illustrated in Fig. 2, by reason of the tension of the spring 12, said bar 10 securely holding the animal between itself and the base 5.

One great advantage in thus constructing and arranging the trap over those with which I am acquainted is the fact that the trap is not set by directly engaging the arm 10 with the plate 16, employed for springing it, but, on the other hand, as before described, the plate 16 is adjusted to its set position by manipulating the comparatively light spring-arm 21. After this has been set, from which there is no danger if accidentally sprung, the bar or rod 10, having a comparatively strong spring 12, is set without in any way manipulating the plate 16, it being necessary only after springing the bar 10 over into place, as illustrated in Fig. 1, to pass the arm 27 over the same and engage it with the curved end 29 of the bar 28.

Having fully described my invention, what I claim as new, and desire to secure by Letters Patent, is—

1. In a trap of the character described, the combination with a base formed with a receptacle, of a pivoted plate fitting over said receptacle and provided with a tripping-arm, a spring-actuated arm against which said tripping-arm rests when the plate is set, a spring-actuated curved bar pivoted to said base, and a pivoted arm fitting over said curved bar when the trap is set, and adapted to be released by said spring-actuated arm when the latter is moved or released by the tripping-arm of said pivoted plate, substantially as described.

2. In a trap of the character described, the combination with a base formed with a receptacle, of a pivoted plate fitting over said receptacle and provided with a tripping-arm, a spring-actuated arm 21 engaging with said tripping-arm when the trap is set, a spring-actuated curved bar 10 pivoted to said base, a pivoted arm 27 adapted to hold said bar in its set position and engage with the vertical rod 28, whereby when said plate is depressed into said receptacle, the tripping-arm will release said spring-actuated arm 21, which in turn releases said pivoted arm 27 and curved bar 10, substantially as described.

Signed at New York, borough of Manhattan, in the county of New York and State of New York, this 20th day of June, A. D. 1902.

RAPHAEL CHASSÉ.

Witnesses:
M. VAN NORTWICK,
GEORGE COOK.